US012019274B2

(12) United States Patent
Harjanne et al.

(10) Patent No.: US 12,019,274 B2
(45) Date of Patent: Jun. 25, 2024

(54) POLARIZATION ROTATOR

(71) Applicant: Teknologian tutkimuskeskus VTT Oy, Espoo (FI)

(72) Inventors: Mikko Harjanne, Espoo (FI); Timo Aalto, Espoo (FI); Matteo Cherchi, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 217 days.

(21) Appl. No.: 17/608,188

(22) PCT Filed: Apr. 30, 2020

(86) PCT No.: PCT/FI2020/050290
§ 371 (c)(1),
(2) Date: Nov. 2, 2021

(87) PCT Pub. No.: WO2020/225479
PCT Pub. Date: Nov. 12, 2020

(65) Prior Publication Data
US 2022/0214500 A1 Jul. 7, 2022

(30) Foreign Application Priority Data
May 3, 2019 (FI) .................................... 20195362

(51) Int. Cl.
*G02B 6/27* (2006.01)
*G02B 5/30* (2006.01)
(Continued)

(52) U.S. Cl.
CPC ......... *G02B 6/2766* (2013.01); *G02B 5/3083* (2013.01); *G02B 6/126* (2013.01); *G02B 27/286* (2013.01); *G02F 1/0136* (2013.01)

(58) Field of Classification Search
CPC .... G02B 6/126; G02B 6/2766; G02B 5/3083; G02B 27/286; G02F 1/0136
See application file for complete search history.

(56) References Cited

U.S. PATENT DOCUMENTS 5,309,535 A 5/1994 Bergano et al.
5,471,340 A * 11/1995 Cheng .................. G02B 27/283
385/11

(Continued)

FOREIGN PATENT DOCUMENTS

CN 104583824 A 4/2015
JP H07325276 A 12/1995
(Continued)

*Primary Examiner* — Daniel Petkovsek
(74) *Attorney, Agent, or Firm* — Laine IP Oy

(57) ABSTRACT

The invention concerns a polarization rotator. The inventive polarization rotator comprises an optical coupler comprising a waveguide having at one first end at least a first port configured as an input port for polarized light and a second port configured as an output port for reflected polarized light, said waveguide having a second end opposite to said first end. It further comprises a birefringent waveplate having on one side a reflective surface, which waveplate is arranged to receive light from said second end of said waveguide and to reflect light transmitted out from said coupler back into said coupler. According to the invention, the waveplate is further configured to cause said birefringent material to rotate the polarization of said reflected light, which amount of rotation depends on an angle of rotation of said birefringent waveplate with respect to said optical coupler.

10 Claims, 3 Drawing Sheets

(51) Int. Cl.
    *G02B 6/126*     (2006.01)
    *G02B 27/28*     (2006.01)
    *G02F 1/01*     (2006.01)

(56) References Cited

U.S. PATENT DOCUMENTS

| | | |
|---|---|---|
| 5,499,132 A | 3/1996 | Tojo et al. |
| 5,901,259 A | 5/1999 | Ando et al. |
| 9,823,500 B2 * | 11/2017 | Lin ..................... G02B 27/283 |
| 2002/0110305 A1 | 8/2002 | Huang et al. |
| 2004/0156574 A1 | 8/2004 | Betts et al. |
| 2004/0257564 A1 | 12/2004 | Madsen |
| 2008/0285130 A1 | 11/2008 | Mehl et al. |
| 2013/0120824 A1 | 5/2013 | Ono et al. |

FOREIGN PATENT DOCUMENTS

| | | |
|---|---|---|
| JP | H09318919 A | 12/1997 |
| JP | 2000193837 A | 7/2000 |
| JP | 2000338428 A | 12/2000 |
| JP | 2018084778 A | 5/2018 |

\* cited by examiner

POLARIZATION ROTATOR

BACKGROUND OF THE INVENTION

The present invention relate to polarization rotators, more particularly to polarization rotator for integrated optics. Existing polarization rotation solutions in integrated optics are based on mode-evolution, on "rotator waveguides" based on asymmetric waveguides that act as waveplates, and on thin wave-plates made of birefringent material inserted into slots etched across a waveguide.

Polarization rotators are optical devices that rotate the polarization axis of a linearly polarized light beam by an angle of choice. In free space optics these devices can be based on the Faraday effect, on birefringence, or on total internal reflection. For guided waves the rotation can also be done with mode evolution. Polarization rotators are key components for example in optical isolators and polarization diversity receivers.

A Faraday rotator requires a material that has a magneto-optic effect. When placed in a magnetic field the material will rotate the plane of linearly polarized light. The effect is non-reciprocal and can therefore be used to make optical isolators. In birefringency based polarization rotators linearly polarized light is decomposed into two components. Phase retardation in the "slow" axis of the material causes the plane of linearly polarized light to rotate. Birefringence can either be a material property or, in case of waveguides, be geometrically induced.

Integrated polarization rotators are often based on the use of some type of a rotator waveguide. Approaches based on cross-polarization coupling or modal evolution has also been proposed. Modal evolution based rotators work on the principle of adiabatically modifying the cross-section of a waveguide so that the optical axis is gradually rotated by the required amount. The transition needs to be adiabatic so that power coupling between different modes does not occur, making the devices very long and difficult to fabricate with conventional waveguide processes. Also, rotation angles other than 90° are hard to achieve.

Light going through multiple total internal reflections in a specific order of directions will have its polarization rotated. These devices are broadband as the operation does not rely on the interference of light.

Known integrated polarization rotators are quite sensitive to fabrication errors and to process variations, as both the orientation of optical axis and the amount of birefringence needs to be accurately controlled. This limits their application in commercial devices. Some technologies, like those using inserted thin wave-plates into etched slots, are demanding from both fabrication and assembly point of view.

OBJECT OF THE INVENTION

The object of the present invention is to provide a polarization rotator that can be manufactured using standard fabrication-insensitive waveguide components, and whose assembly requirements are less strict than in known solutions. In order to accomplish this, according to one aspect of the invention an optical coupler is provided, with at least a first port and a second port and a birefringent waveplate having a reflective surface.

The inventive polarization rotator for integrated optics offers considerable advantages, as it uses standard, fabrication insensitive waveguide components combined with assembly of an external wave-plate. Compared to the slot-integrated wave-plate, the assembly does not require high translational alignment accuracy, only angular alignment is required to control the rotation of the polarization.

Thus, an inventive polarization rotator device is simple to realize using standard waveguide components and it requires no changes to the photonic integrated circuit fabrication process. The assembly of the wave-plate with the optics chip is simple as only the angular alignment needs to be precise.

SUMMARY OF THE INVENTION

According to the main aspect of the invention, a polarization rotator is provided that comprises:
- an optical coupler comprising a waveguide having at one first end at least a first port configured as an input port for polarized light and a second port configured as an output port for reflected polarized light, said waveguide having a second end opposite to said first end;
- a birefringent waveplate having on one side a reflective surface, said waveplate being arranged to receive light from said second end of said waveguide and to reflect light transmitted out from said coupler back into said coupler.

According to the invention, the waveplate is further configured to cause the birefringent material to rotate the polarization of said reflected light, which amount of rotation depends on an angle of rotation of the birefringent waveplate with respect to the optical coupler.

The waveguide has an optical axis determined by the predominant light propagation direction in the waveguide.

In some embodiments, the birefringent waveplate is oriented vertically with respect to said waveguide so that a normal to the plane of said waveplate is perpendicular to the said second end of said waveguide, and wherein the polarization rotation is determined by the angle of rotation of said waveplate around an axis normal to the plane of the birefringent waveplate. In some variants of these embodiments, the polarization rotation may be tuned by rotating the waveplate around the axis normal to the plane of said birefringent waveplate.

In some other embodiments, the birefringent waveplate is located laterally with respect to said waveguide so that a normal to the plane of said waveplate is perpendicular to the optical axis of said waveguide, and light is guided from said opposite end of said waveguide to said birefringent waveplate by means of an optical element, such as a mirror or a second waveguide, and wherein the polarization rotation is determined by the angle of rotation of said waveplate around an axis normal to the plane of the birefringent waveplate. In some variants of these embodiments, the polarization rotation is tunable when said waveplate is rotated around said axis normal to the plane of the birefringent waveplate.

In some further embodiments light transmitted out from said second end of said waveguide is coupled back into said coupler by at least one further waveguide arranged between the coupler and the waveplate. In some embodiments, the axis normal to said birefringent waveplate is perpendicular to the optical axes of said waveplate.

BRIEF DESCRIPTION OF ATTACHED DRAWINGS

DETAILED DESCRIPTION OF THE INVENTION

Figure 1:
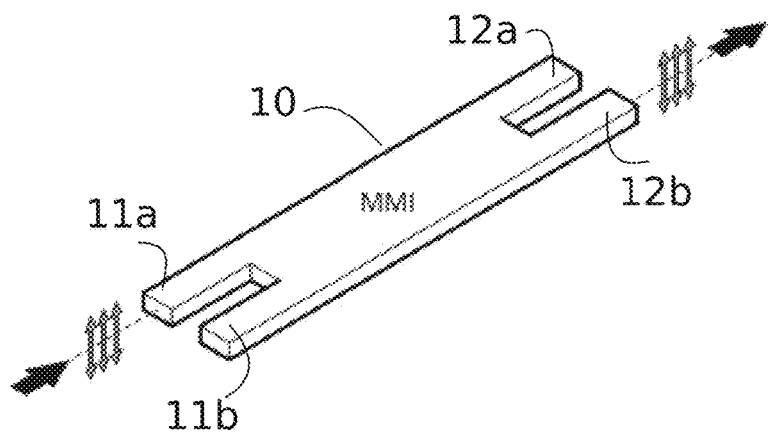
FIG. 1 shows a prior art MMI coupler.

FIG. 1 shows a prior art 2×2 multi-mode interference (MMI) coupler 10 with one-to-one imaging between input ports 11a, 11b and output port 12a, 12b, here with a 100% light transmission to cross-port (11a→12b) and with the polarization unchanged.

Figure 2A:
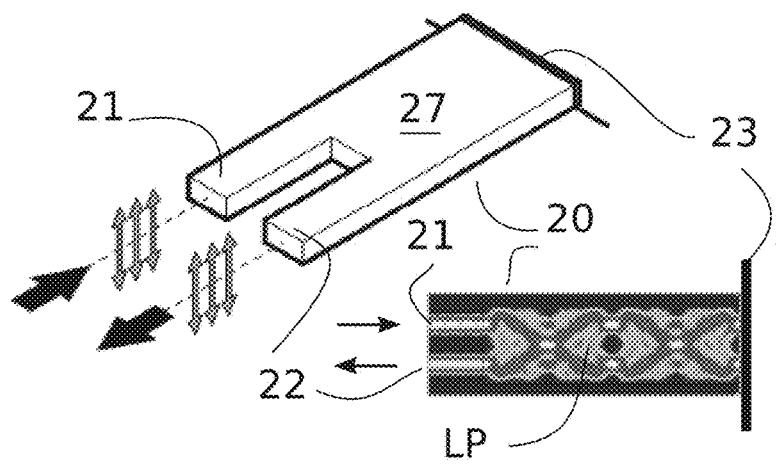
FIG. 2A-2C shows various basic aspects of one embodiment of an inventive the basic polarization rotator.

FIG. 2A shows the basic structure of on an MMI coupler 20 that may be used in the inventive polarization rotator. The coupler 20 is like the one in FIG. 1, but here it is only half the length and is terminated with a reflector 23. Thus the input port 21 and the output port 22 are on the same side, receiving and transmitting light in opposite directions, while retaining the same one-to-one imaging between input and output ports as the device in FIG. 1. The coupler 20 may preferably be polarization independent and, instead of an MMI, it can also be for example a directional coupler. The purpose of the coupler 20 is to route the light reflected from the wave-plate 24 into a different port than the input port, as reflecting the light back to the source is usually unwanted and can be harmful for example to the optical operation of lasers. The return path LP (Light Propagation) for the light in the coupler is provided by a reflector 23 that routes light into the output port 22. The waveguide of the coupler is denoted with reference 27. The waveguide 27 may be the whole coupler, or the coupler 20 may involve additional layers or materials not shown, For the purpose of this description, the coupler 20 and the waveguide 27 have identical functions.

Figure 2B:
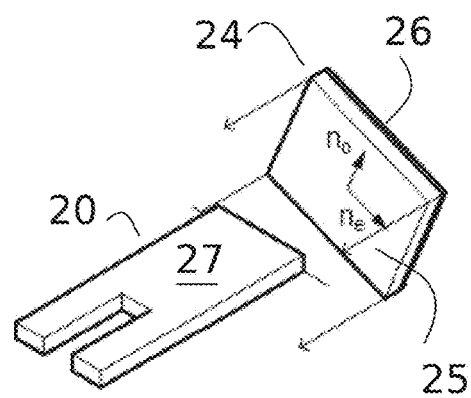

FIG. 2B shows the principle of an inventive polarization rotator. The reflector 23 in FIG. 2A is replaced with a reflective wave-plate 24 that is placed parallel to the end surface of the MMI coupler 20. The wave-plate 24 will cause a polarization rotation in the reflected optical field. The waveplate may consist of a layer 25 birefringent material having a "fast" axis with a first refractive index $\eta_o$ and a "slow" axis with a second refractive index $\eta_e$. The birefringent material is covered on one side with a reflective surface 26, e.g. by metallization. By using a reflective wave-plate 24 to reflect the optical field, the polarization of the light can be rotated as needed by aligning the angle of the wave-plate's 24 optical axis relative to the coupler 20.

Figure 2C:
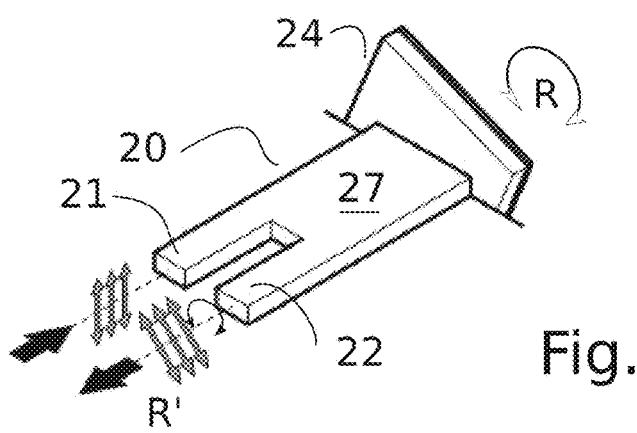

FIG. 2C shows an inventive tunable polarization rotator having a rotatable wave-plate 24 in operation. As can be seen, the amount of polarization rotation R' at the output port 22 with respect to the polarization at the input port 21, depends on the amount of rotation R of the optical axis of the wave-plate 24, relative to the waveguide 20.

In its simplest form, the coupler can be located at the edge of the optical chip and the reflective wave-plate is then external to the chip. The reflective wave-plate can also be placed vertically in a trench on the optical chip. Contrary to previous slot-integration concepts, here the trench size is not critical as it only has to be large enough to house the wave-plate. Furthermore, the coupler and the wave-plate can be physically separated and connected with waveguides (see FIG. 5), so that the coupler may be freely placed on the optical chip and the wave-plate be located at chip edge where assembly is trivial.

Figure 3:
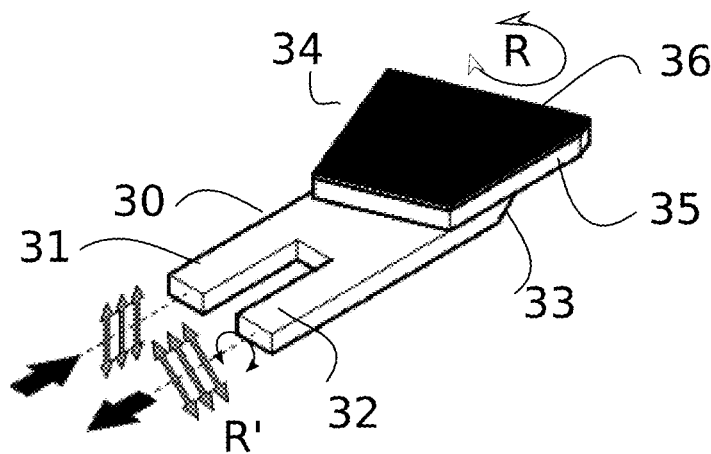
FIG. 3 shows another embodiment of an inventive polarization rotator.

FIG. 3 shows another embodiment of the invention, where the coupler 30 is terminated with a mirror 33, which reflects light upwards. This allows placing a birefringent wave-plate 34 on top of the coupler 30. The light fed into the input port 31 of the coupler is reflected up through the birefringent layer 35 and back from the reflective surface 36, and onward through the coupler to the output port 32, where the exiting light has a polarization rotation R' which angle corresponds to the angle R with which the waveplate 34 is turned on top of the coupler.

Figure 4:
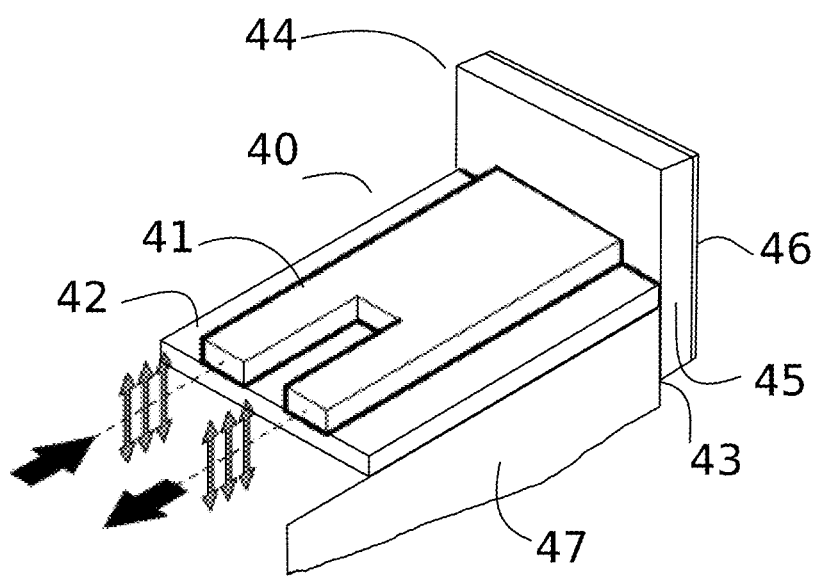
FIG. 4 shows further details of an inventive polarization rotator.

FIG. 4 shows an embodiment of a coupler 40 like the one in FIGS. 2A-2C in somewhat more detail. The coupler 40 may consist of a layer 41 of silicon on a layer 42 of silica ($SiO_2$), with a silicon substrate 47 underneath, in a typical SOI configuration. The reflecting wave-plate 44 may consist of a birefringent layer 45 of lithium niobate ($LiNbO_3$), for example. The thickness of layer 45 may be 5-10 μm, for example. The reflecting layer 46 may consist of a highly reflective (HR) reflector, for example. The end of the SOI device 41, 42, 47 facing the reflector 44 may be provided with an anti-reflective (AR) coating layer 43.

Figure 5:
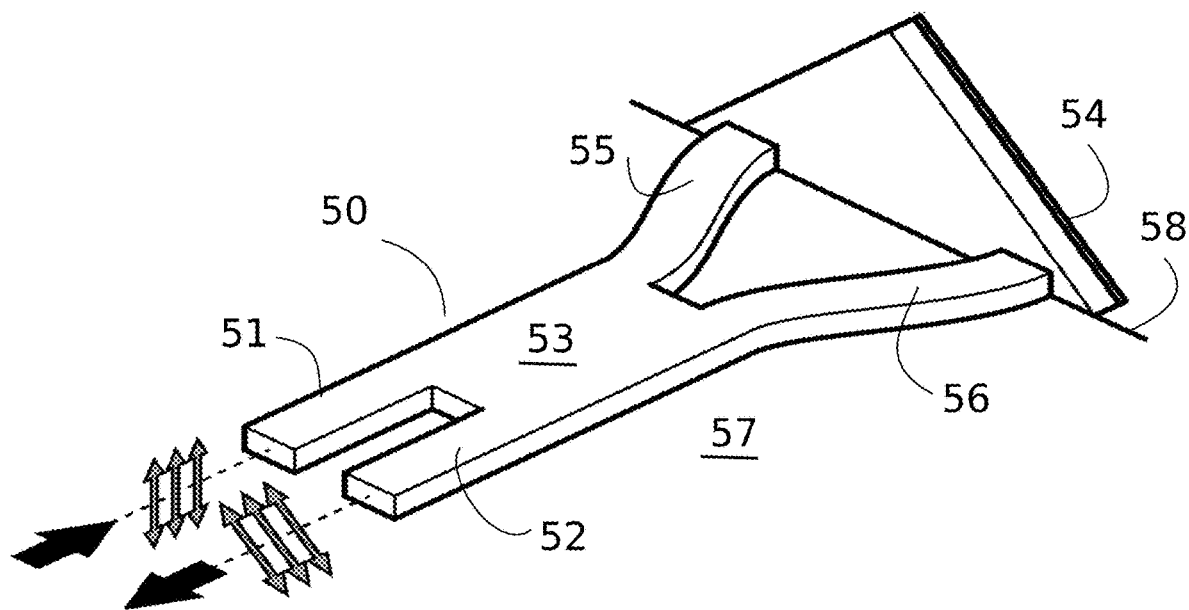
FIG. 5 shows a further embodiment of an inventive polarization rotator.

FIG. 5 shows an embodiment of a coupler 50 similar to the one shown in FIG. 2C, with input and output ports 51, 52 and a waveguide 53. Here the wave-plate 54, instead of being located immediately after the coupler, is optically connected to the coupler via extra waveguides 55 and 56. The light transmitted out from the waveguide 53 is coupled to both intermediate waveguides 55, 56 and returned back to the coupler 50 by same intermediate waveguides 55, 56, as both the intermediate waveguides 55, 56 are arranged between the waveguide 53 and the waveplate 54. This arrangement allows for example locating the coupler in the middle of an optical chip 57 and the wave-plate at the edge 58 of the chip.

Light exiting a waveguide will start to expand with a rate that is inversely proportional to the beam size. In order to reduce beam divergence and hence coupling losses, wide mode-fields may be provided at the edge of the second end of the waveguide in the coupler. Horizontally the expansion can be done by widening the waveguide. The waveguide layer is, however, typically thin and the beam will start to expand rapidly in vertical direction. The more the beam expands while it propagates in free-space, the less power is coupled back to the waveguide if reflection is from a flat surface.

Because vertical divergence depends on waveguide thickness which is typically fixed, focusing the vertically expanded light back to the waveguide after reflection by some means may be useful. This may be done by a cylindrical reflector, for example. The curved face of a cylindrical reflector is a section of a cylinder on which light always impinges on perpendicularly. The reflected light will then be focused back into the SOI waveguide.

An alternative to reduce coupling losses is to collimate in the vertical direction the light exiting the waveguide with a cylindrical lens, and reflect this collimated beam on a flat wave-plate. The beam expansion is then be mitigated by the cylindrical lens. A cylindrical lens is a lens which focuses light in only one direction, forming a focus line instead of a point.

Figure 6:
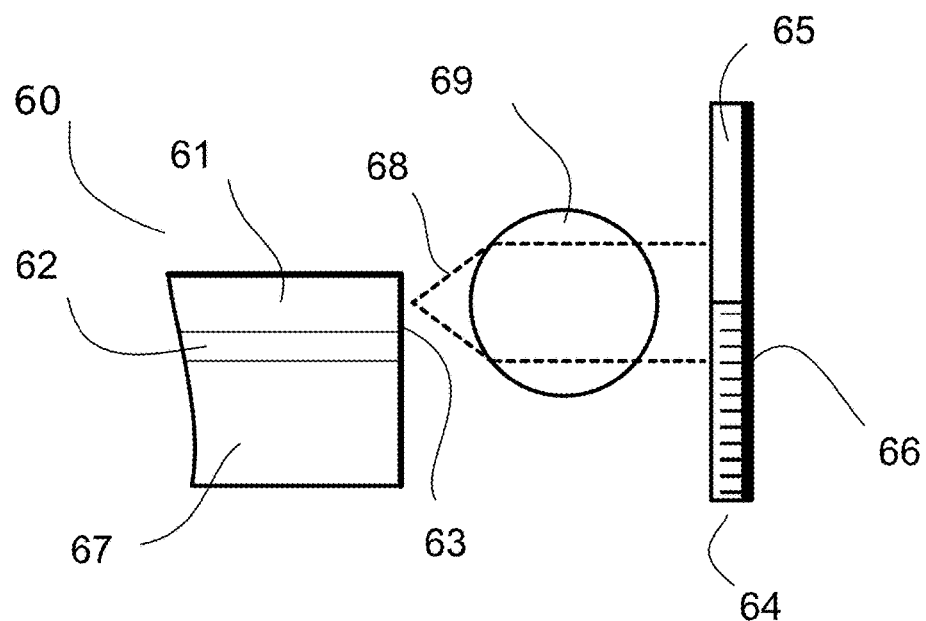
FIG. 6 shows a further embodiment of an inventive polarization rotator.

FIG. 6 shows an embodiment of a coupler similar to the one shown in FIGS. 2C and 4. The coupler 60 may consist of a layer 61 of silicon on a layer 62 of silica ($SiO_2$), with a silicon substrate 67 underneath. The reflecting wave-plate 64 has a birefringent layer 65 and a reflecting layer 66, and the end of the SOI device 61, 62, 67 facing the reflector 64 may be provided with an anti-reflective (AR) coating layer 63.

In the embodiment of FIG. 6, a light beam 68 exiting the SOI device 61 is collimated with a cylindrical lens 69 located between the coupler and the wave-plate 64. The light is returned back to the coupler 61 by same cylindircal lens 69. This arrangement reduces the coupling losses caused by divergence of light beam 68.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. A polarization rotator, comprising:
an optical coupler comprising a waveguide having at one first end at least a first port configured as an input port for polarized light and a second port configured as an output port for reflected polarized light, said waveguide having a second end opposite to said first end; and
a birefringent waveplate having on one side a reflective surface, said waveplate being arranged to receive light from said second end of said waveguide and to reflect light transmitted out from said coupler back into said coupler, wherein said waveplate is further configured to cause birefringent material to rotate the polarization of said reflected light, wherein an amount of rotation of the polarization of said reflected light depends on an angle of rotation of said waveplate with respect to said optical coupler, wherein the polarization rotation is tunable when said waveplate is rotated around said axis normal to the plane of said waveplate.

2. The polarization rotator according to claim 1, wherein said waveplate is oriented vertically with respect to said waveguide so that a normal to the plane of said waveplate is perpendicular to the said second end of said waveguide, and wherein the polarization rotation is determined by the angle of rotation of said waveplate around an axis normal to the plane of said waveplate.

3. The polarization rotator according to claim 2, wherein light transmitted out from said second end of said waveguide is coupled back into said coupler by at least one further waveguide arranged between said coupler and said waveplate.

4. The polarization rotator according to claim 2, wherein an axis normal to the plane of said waveplate is perpendicular to the optical axis of said waveplate.

5. The polarization rotator according to claim 1, wherein said waveplate is located laterally with respect to said waveguide so that a normal to the plane of said waveplate is perpendicular to the optical axis of said waveguide, and light is guided from said opposite end of said waveguide to said waveplate by means of an optical element, such as a mirror or a second waveguide, and wherein the polarization rotation is
determined by the angle of rotation of said waveplate around an axis normal to the plane of said birefringent waveplate.

6. The polarization rotator according to claim 5, wherein light transmitted out from said second end of said waveguide is coupled back into said coupler by at least one further waveguide arranged between said coupler and said waveplate.

7. The polarization rotator according to claim 5, wherein an axis normal to the plane of said waveplate is perpendicular to the optical axis of said waveplate.

8. The polarization rotator according to claim 1, wherein light transmitted out from said second end of said waveguide is coupled back into said coupler by at least one further waveguide arranged between said coupler and said waveplate.

9. The polarization rotator according to claim 8, wherein an axis normal to the plane of said waveplate is perpendicular to the optical axis of said waveplate.

10. The polarization rotator according to claim 1, wherein an axis normal to the plane of said waveplate is perpendicular to the optical axis of said waveplate.

* * * * *